(12) United States Patent
Chotoku et al.

(10) Patent No.: US 7,200,322 B2
(45) Date of Patent: Apr. 3, 2007

(54) VIDEO-SIGNAL RECORDING AND PLAYBACK APPARATUS, VIDEO-SIGNAL RECORDING AND PLAYBACK METHOD AND RECORDING MEDIUM

(75) Inventors: Koichi Chotoku, Tokyo (JP); Masashi Ohta, Tokyo (JP); Toshimichi Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1014 days.

(21) Appl. No.: 09/903,011

(22) Filed: Jul. 11, 2001

(65) Prior Publication Data

US 2002/0006268 A1    Jan. 17, 2002

(30) Foreign Application Priority Data

Jul. 13, 2000    (JP)    ............................ P2000-212293

(51) Int. Cl.
*H04N 5/91*    (2006.01)
(52) U.S. Cl. ......................................... 386/83; 386/95
(58) Field of Classification Search .................. 386/46, 386/83, 95, 111, 120
See application file for complete search history.

(56) References Cited

U.S. PATENT DOCUMENTS

| | | | | |
|---|---|---|---|---|
| 5,546,191 A | * | 8/1996 | Hibi et al. ..................... | 386/83 |
| 5,974,218 A | * | 10/1999 | Nagasaka et al. ............. | 386/46 |
| 6,160,950 A | * | 12/2000 | Shimazaki et al. ............ | 386/46 |
| 6,252,629 B1 | * | 6/2001 | Takatori ....................... | 348/460 |
| 6,728,473 B1 | * | 4/2004 | Chotoku et al. .............. | 386/95 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

Disclosed is a video-signal recording & playback apparatus and method for recording and playing back a video signal of a television-broadcast program and a recording medium for storing a computer-readable program for controlling the video-signal recording & playback apparatus. A video-signal recording & playback apparatus includes a detection element for detecting relevant information related to a program being recorded and a modification element for automatically modifying an algorithm of detecting a program-representing picture in dependence of the relevant information.

8 Claims, 5 Drawing Sheets

FIG.3

|        | GENRE 1 | GENRE 2 | OTHER |
|--------|---------|---------|-------|
| TYPE 1 | 80      | 20      | 40    |
| TYPE 2 | 20      | 60      | 50    |
| TYPE 3 | 10      | 10      | 30    |

VIDEO-SIGNAL RECORDING AND PLAYBACK APPARATUS, VIDEO-SIGNAL RECORDING AND PLAYBACK METHOD AND RECORDING MEDIUM

BACKGROUND OF THE INVENTION

The present invention relates to a video-signal recording & playback apparatus, a video-signal recording & playback method and a recording medium. More particularly, the present invention relates to a video-signal recording & playback apparatus suitable for a case in which a recommended position to a start an operation to playback a video signal from a recording medium is also recorded into a recording medium in an operation to record a video signal into the recording medium, relates to a video-signal recording & playback method adopted in the video-signal recording & playback apparatus and relates to a recording medium for recording a procedure for implementing the video-signal recording & playback method.

In order to allow the user to grasp the contents of a program recorded on a recording medium or the contents of a group of such programs, or in order to search such a recording medium for a program, there is provided a method whereby a plurality of shrunk static pictures or moving pictures each representing a program or a scene is displayed on a screen and the user is allowed to specify one of the displayed pictures in order to select a desired program or a desired scene of a program.

Conventionally, pictures each representing a program or a scene are each obtained right after the beginning of a program or extracted at fixed intervals.

By the way, a representative picture determined by adoption of the method described above may include, for example, both the face of a person and a caption, which are on the display screen at the same time. It is thus quite within the bounds of possibility that such a representative picture suitably represents a recorded program when the genre of the recorded program is news. It is out of the bounds of possibility, however, that such a representative picture meaningfully represents a recorded program when the genre of the recorded program is a movie.

As a result, there is raised a problem that a representative picture determined by adoption of the method described above is not a sufficient means for use by the user to grasp the contents of a program or as a recommended position in determination of a start position of a program.

SUMMARY OF THE INVENTION

It is thus an object of the present invention addressing the problems described above to provide the user with a capability of grasping the contents of a program and to provide a capability of detecting and recording a position usable by the user as a recommended position in determination of a start position of a program.

A video-signal recording & playback apparatus provided by the present invention is characterized in that the video-signal recording & playback apparatus includes a detection means for detecting relevant information related to a program being recorded and a modification means for automatically modifying an algorithm of detecting a program-representing picture in dependence of the relevant information.

The detection means is capable of detecting information on a genre of a program being recorded.

A video-signal recording & playback method provided by the present invention is characterized in that the video-signal recording & playback method includes the steps of detecting relevant information related to a program being recorded and automatically modifying an algorithm of detecting a program-representing picture in dependence of the relevant information.

A recording medium provided by the present invention for storing a computer-readable program is characterized in that the program includes the steps of detecting relevant information related to a program being recorded and automatically modifying an algorithm of detecting a program-representing picture in dependence of the relevant information.

According to a video-signal recording & playback apparatus and video-signal recording & playback method and a program recorded in the recording medium provided by the present invention, relevant information related to a program being recorded is detected and an algorithm of detecting a program-representing picture is automatically modified in dependence of the relevant information.

As a result, the user is capable of grasping the contents of a program and it is possible to detect a position usable as a recommended position for determining a start position of a playback operation.

The above and other objects, features and advantages of the present invention will become apparent from the following description and the appended claims, taken in conjunction with the accompanying drawings in which like parts or elements denoted by like reference symbols.

BRIEF DESCRIPTION OF THE DIAGRAMS

FIG. 3 is a diagram showing a typical table for determining an evaluation value from a genre and the type of a detected representative picture in the embodiment of the present invention;

DETAILED DESCRIPTION OF THE PREFERRED EMBODIMENT

A hard disk recorder implemented by a preferred embodiment of the present invention is explained by referring to diagrams as follows.

Figure 1:
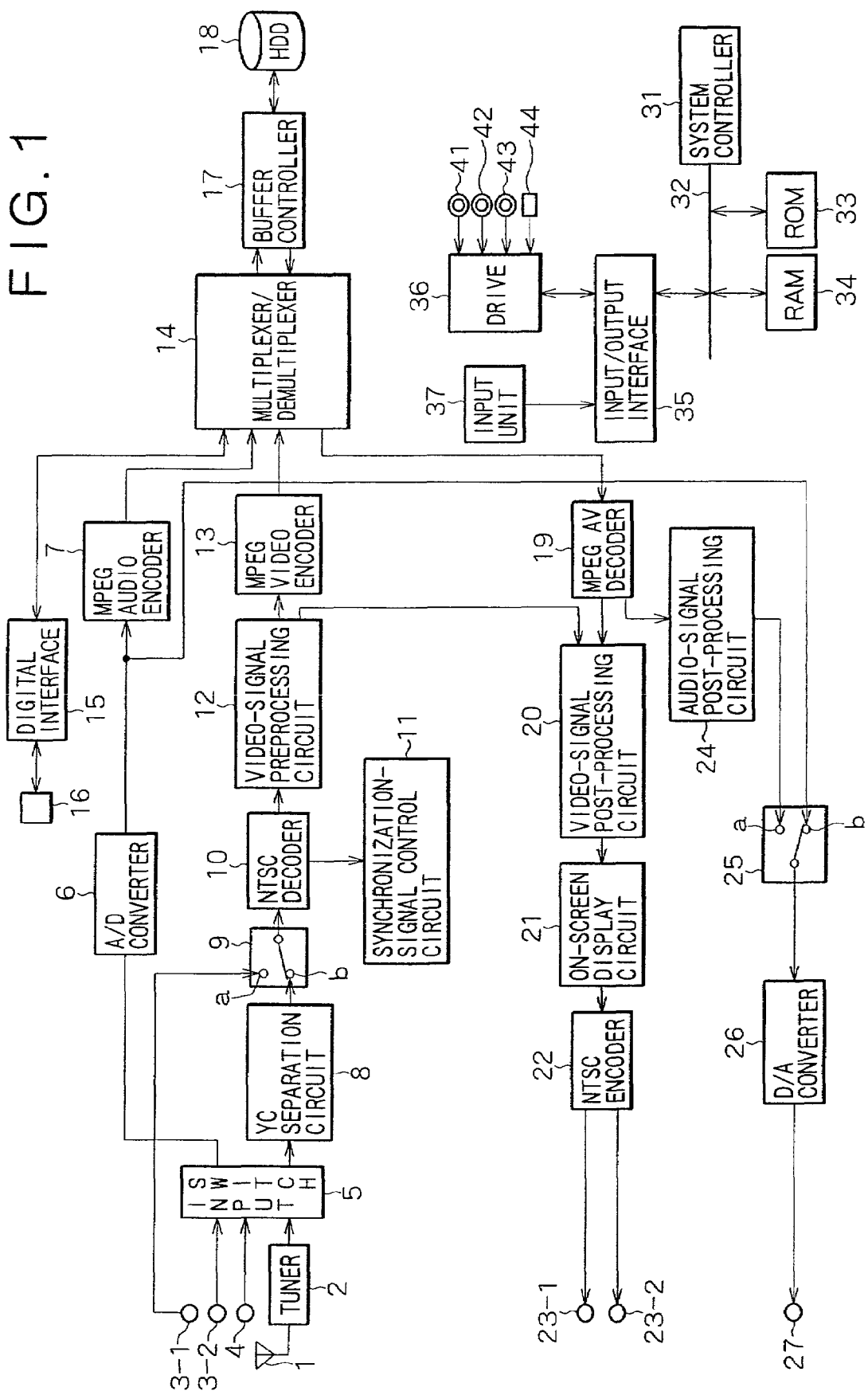
FIG. 1 is a block diagram showing a typical configuration of a hard disk recorder implemented by an embodiment of the present invention.

FIG. 1 is a block diagram showing a typical configuration of a hard disk recorder. An antenna 1 receives a television broadcast and supplies a signal of the broadcast to a tuner 2. In accordance with a command issued by a system controller 31, the tuner 2 extracts a signal of a program of a predetermined channel from the signal of the television broadcast received from the antenna 1. The extracted signal is supplied to an input switch 5.

An external apparatus not shown in the figure supplies an S video signal to a terminal a of a switch 9 by way of an external video input terminal 3-1. An S video signal is separated signals comprising a Y signal (luminance signal) and a C signal (chrominance signal). An external apparatus not shown in the figure supplies a composite video signal to the input switch 5 by way of an external video input terminal 3-2. An external apparatus not shown in the figure supplies an audio signal to the input switch 5 by way of an external audio input terminal 4.

In accordance with a command issued by the system controller 31, the input switch 5 selects a desired signal from the video signal and the audio signal, which are supplied thereto. If the selected signal is the composite video signal, the input switch 5 supplies the selected composite video signal to a YC circuit 8. If the selected signal is the audio signal, on the other hand, the input switch 5 supplies the selected audio signal to an A/D (Analog to Digital) converter 6.

The A/D converter 6 converts an audio signal received from the input switch 5 into digital data by A/D conversion and supplies the digital data to an MPEG (Moving Picture Experts Group) audio encoder 7. The A/D converter 6 also supplies the digital audio data obtained as a result of the A/D conversion to a terminal b of the input switch 25. In accordance with a command issued by the system controller 31, the MPEG audio encoder 7 carries out a compression process adopting an MPEG technique on the digital audio data received from the A/D converter 6 to generate an audio ES (elementary stream). The MPEG audio encoder 7 supplies the audio ES to a multiplexer/demultiplexer 14.

In accordance with a command issued by the system controller 31, a YC separation circuit 8 separates a composite video signal received from the input switch 5 into a luminance signal (Y signal) and a chrominance signal (C signal). The YC separation circuit 8 supplies the Y signal and the C signal to an NTSC (National Television System Committee) decoder 10 by way of a terminal b of the switch 9. In accordance with a command issued by the system controller 31, the switch 9 changes its contact to a terminal a to forward an S signal received from an external apparatus to the NTSC decoder 10. Also in accordance with a command issued by the system controller 31, the switch 9 changes its contact to a terminal b to forward Y and C signals received from the YC separation circuit 8 to the NTSC decoder 10.

In accordance with a command issued by the system controller 31, the NTSC decoder 10 carries out processes such as A/D conversion and chroma encode processing on a video signal received from the switch 9 to convert the video signal into a digital component video signal referred to hereafter as picture data. The NTSC decoder 10 supplies the picture data to a video-signal preprocessing circuit 12. The NTSC decoder 10 also generates a clock signal based on a horizontal synchronization signal of a received video signal. In addition, the NTSC decoder 10 supplies a field-identifying signal, a vertical synchronization signal and the horizontal synchronization signal obtained as a result of synchronous separation to a synchronization-signal control circuit 11.

In accordance with a command issued by the system controller 31, the synchronization-signal control circuit 11 generates clock and synchronization signals with the field-identifying signal, the vertical synchronization signal and the horizontal synchronization from the NTSC decoder 10 used as a reference. The synchronization-signal control circuit 11 supplies the generated clock and synchronization signals to a variety of components.

In accordance with a command issued by the system controller 31, the video-signal preprocessing circuit 12 carries out video signal processing such as pre-filtering on picture data received from the NTSC decoder 10 to detect a representative picture. The video-signal preprocessing circuit 12 supplies the representative picture to an MPEG video encoder 13 and a video-signal post-processing circuit 20. In accordance with a command issued by the system controller 31, the MPEG video encoder 13 carries out an encoding process such as DCT (Discrete Cosine Transform) processing on picture data received from the video-signal preprocessing circuit 12 to generate an elementary stream of the picture. The MPEG video encoder 13 supplies the elementary stream to the multiplexer/demultiplexer 14.

In accordance with a command issued by the system controller 31, in a recording operation, the multiplexer/demultiplexer 14 multiplexes an elementary stream of a picture and an audio elementary stream, which has completed compression adopting the MPEG technique, as well as a variety of control signals to generate typically an MPEG TS (transport stream). The multiplexer/demultiplexer 14 supplies the MPEG TS to a buffer controller 17. In a playback operation, on the other hand, the multiplexer/demultiplexer 14 demultiplexes an MPEG TS received from the buffer controller 17 to extract a PES (Packetized Elementary Stream) from the MPEG TS. The multiplexer/demultiplexer 14 supplies the extracted PES to an AV MPEG decoder 19.

In accordance with a command issued by the system controller 31, the buffer controller 17 executes control to intermittently supply a transport stream received continuously from the multiplexer/demultiplexer 14 to an HDD (Hard Disk Drive) 18. While the HDD 18 is carrying out a seek operation, for example, a transport stream cannot be written into a hard disk of the HDD 18. In this case, the transport stream is stored temporarily in a buffer. As the seek operation is completed, allowing a transport stream to be written into the hard disk, the stream is read out from the buffer and stored into the hard disk at a rate higher than a rate of inputting data to the buffer. In this way, a transport stream received continuously from the multiplexer/demultiplexer 14 can be all written into the hard disk of the HDD 18.

The buffer controller 17 also executes control to store signal received from the HDD 18 intermittently into a buffer so that the stored signal can be supplied to the multiplexer/demultiplexer 14 as a continuous transport stream.

In accordance with a command issued by the system controller 31, the HDD 18 stores a transport stream received from the buffer controller 17 intermittently into the hard disk at a predetermined address. The HDD 18 also seeks a predetermined address, reads out a transport stream from the address and supplies the stream to the buffer controller 17.

The buffer controller 17 and the HDD 18 adopt an IDE (Integrated Drive Electronics) protocol. It should be noted, however, that any protocol can be adopted in the present invention as long as the protocol is used for recording a transport stream.

In accordance with a command issued by the system controller 31, the MPEG AV decoder 19 separates a PES received from the multiplexer/demultiplexer 14 into a video elementary stream and an audio elementary stream. The MPEG AV decoder 19 then carries out a predetermined decoding process on the elementary streams, supplying video data of a base band to the video-signal post-processing circuit 20 and audio data of the base band to a audio-signal post-processing circuit 24.

In accordance with a command issued by the system controller 31, the video-signal post-processing circuit 20 switches the input from a video signal supplied by the video-signal preprocessing circuit 12 to video data of the base band supplied by the MPEG AV decoder 19 or vice versa, and synthesizes the video signal and the video data.

The video-signal post-processing circuit 20 also carries out filtering on the input data and supplies the filtered data to an on-screen display circuit 21. In addition, the video-signal post-processing circuit 20 also generates a GUI (Graphic User Interface) for displaying pictures and generates a representative picture of a program represented by picture data. The video-signal post-processing circuit 20 then pastes the representative picture of a program on a window and supplies the window to the on-screen display circuit 21.

In accordance with a command issued by the system controller 31, the on-screen display circuit 21 converts text information into corresponding picture data and superposes the picture data obtained as a result of the conversion on picture data received from the video-signal post-processing circuit 20. The on-screen display circuit 21 then supplies the superposed picture data to an NTSC encoder 22.

In accordance with a command issued by the system controller 31, the NTSC encoder 22 converts picture data (component digital signal) received from the on-screen display circuit 21 into Y and C signals. Then, the NTSC encoder 22 generates an S video signal completing a D/A conversion process and an analog composite video signal. The NTSC encoder 22 supplies the S video signal completing a D/A conversion process and the analog composite video signal to an external apparatus through external video output terminals 23-1 and 23-2 respectively.

In accordance with a command issued by the system controller 31, the audio-signal post-processing circuit 24 carries out processes such as filtering, fading and conversational-speed conversion on audio data of the base band received from the MPEG AV decoder 19, supplying a result of the processes to a terminal a of a switch 25.

In accordance with a command issued by the system controller 31, the switch 25 sets its contact at a terminal a to supply audio data received from the audio-signal post-processing circuit 24 to a D/A converter 26, or a terminal b to supply audio data received from the A/D converter 6 to the D/A converter 26. The D/A converter 26 converts audio data received from the switch 25 into analog data in D/A conversion and supplies the analog data to an external apparatus by way of an external audio output terminal 27.

The system controller 31 reads out a program from a ROM (Read-Only Memory) 33 through a host bus 32 and executes the program to control other components. A RAM (Random-Access Memory) 34 is used as needed for storing a program and data which are required for controlling the other components. The system controller 31, the ROM 33 and the RAM 34 are connected to each other and to an input/output interface 35 by the host bus 32. The input/output interface 35 is connected to a drive 36 for driving a magnetic disk 41, an optical disk 42, a magneto-optical disk 43 or a semiconductor memory 44. The input/output interface 35 is also connected to an input unit 37 including a keyboard, a mouse, buttons, switches and a remote commander and so forth.

The hard disk recorder is capable of inputting and outputting not only an analog signal, but also digital data. For example, an IRD (Integrated Receiver Decoder) not shown in the figure is allowed to supply a transport stream to a digital interface 15 through an IEEE (the Institute of Electrical and Electronics Engineers)-1394 serial bus connected to a digital input/output terminal 16. In accordance with a command issued by the system controller 31, the digital interface 15 carries out an interfacing process to supply the input transport stream to the multiplexer/demultiplexer 14. In accordance with a command issued by the system controller 31, the multiplexer/demultiplexer 14 outputs the transport stream received from the digital interface 15 to the buffer controller 17.

The multiplexer/demultiplexer 14 also outputs a transport stream received from the buffer controller 17 to the digital interface 15. The digital interface 15 supplies the transport stream received from the multiplexer/demultiplexer 14 to the external IRD through a digital input/output terminal 16 and the IEEE 1394 serial bus. The IRD outputs the transport stream on a monitor connected thereto to be displayed on the monitor.

In this embodiment, the hard disk recorder is connected to the IRD as described above. It should be noted, however, that the scope of the present invention is not limited to this configuration. For example, the hard disk recorder can also be connected to a personal computer or another apparatus.

In addition, while a video signal is compressed by adoption of the MPEG technique, the scope of the present invention is not limited to this technique. That is to say, other compression techniques can also be adopted.

Furthermore, in place of a hard disk of the HDD 18, it is also possible to use other recording media such as an optical disk, a magneto-optical disk and a solid-state memory.

The following description explains a method based on information on a program to modify an algorithm used in detection of a representative picture by the video-signal-preprocessing circuit 12.

With this method, it is possible to detect a picture including a caption, a picture including the face of a person, a bright picture such as computer graphics and other pictures. An evaluation value representing the degree of importance is attached to a representative picture obtained by adoption of this method. A representative picture with a largest evaluation value among representative pictures detected for an entire program by adoption of this method is used as a representative picture that best represents the contents of the program.

The following description explains a method of using program-genre information of SI (Service Information) included in a broadcast signal such as a BS digital broadcast or a CS digital broadcast as a typical method of using program information. In accordance with a portion of operating prescriptions known as ARIB TR-B15 for describing the BS digital broadcast, SI is classified into large categories and medium categories. The large categories include news, sports, dramas and varieties whereas the medium categories include weather forecasts, politics, discussions and local news for a large category of news. By analyzing the SI of a program or a channel being recorded, information on a genre can be obtained.

As a method of detecting a representative picture, detection of types 1, 2, 3 and 4 is considered hereinafter. Type 1 is the type of screens each including the face of a person and a caption. Type 2 is the type of screens each having bright colors such as ones appearing in computer graphics. Type 3 is the type of screens each appearing at fixed intervals such as 5 minutes. Type 4 is the type of screens each appearing right after a commercial message.

Figure 2:
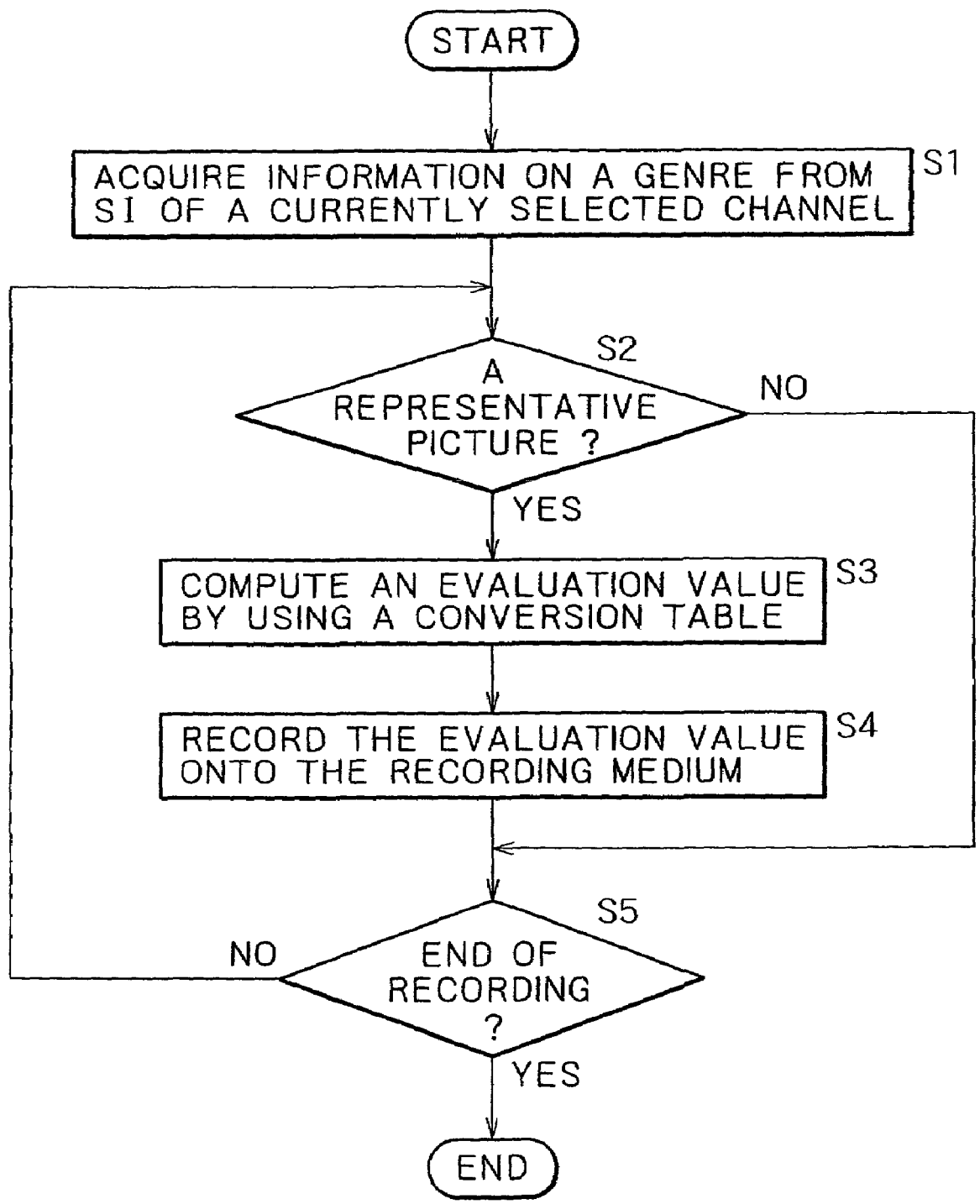
FIG. 2 is a flowchart representing operations to record a video signal into a hard disk recorder.

The following description explains a method of determining weighting of representative pictures while recording 2 programs, namely, news or genre 1 and a variety or genre 2, by referring to a flowchart shown in FIG. 2.

As shown in the figure, the flowchart begins with a step S1 when a recording operation is started. At the step S1, information on a genre is acquired from SI of a program being recorded. At the next step S2, the video-signalpreprocessing unit 12 forms a judgment as to whether or not a frame to be recorded can serve as a representative picture.

If the outcome of the judgment formed at the step S2 indicates that a frame to be recorded can serve as a representative picture, the flow of the processing goes on to a step S3 at which an evaluation value of the detected representative picture is determined on the basis of the information on the genre and the type of the picture. To put it in detail, an evaluation value found from a table like one shown in FIG. 3 is attached to the representative picture. For example, if the program being recorded is genre 1 and the type of the representative picture obtained from the video-signal-preprocessing circuit 12 is type 1, an evaluation of 80 is given to the representative picture. For the same genre 1, an evaluation of 20 or 10 is given to the representative picture in the case of type 2 or type 3 respectively.

Then, at the next step S4, the evaluation value given to the representative picture at the step S3 is stored in a recording medium as information on the representative picture. The stored evaluation value is used in presentation of the representative picture representing a program at a start of a playback operation or in presentation of a recommended starting position in a program in the playback operation to the user.

By carrying out the processing described above, it is possible to automatically change the type of a representative picture which has a great degree of importance in accordance with the genre of the program. As a result, a picture including a caption and the face of a person can be detected at a high priority in the case of a news program. In the case of a variety, on the other hand, a picture with bright colors can be detected at a high priority. If such pictures are not detected, a representative picture is selected between a picture at the beginning of the program upon completion of a commercial message and pictures detected at fixed intervals.

The flow of the processing then goes on to a step S5 to form a judgment as to whether or not the operation to record the program has ended. If the recording operation has not been completed, the pieces of processing at the steps S2 to S5 are carried out again repeatedly till the recording operation is completed.

Figure 4:
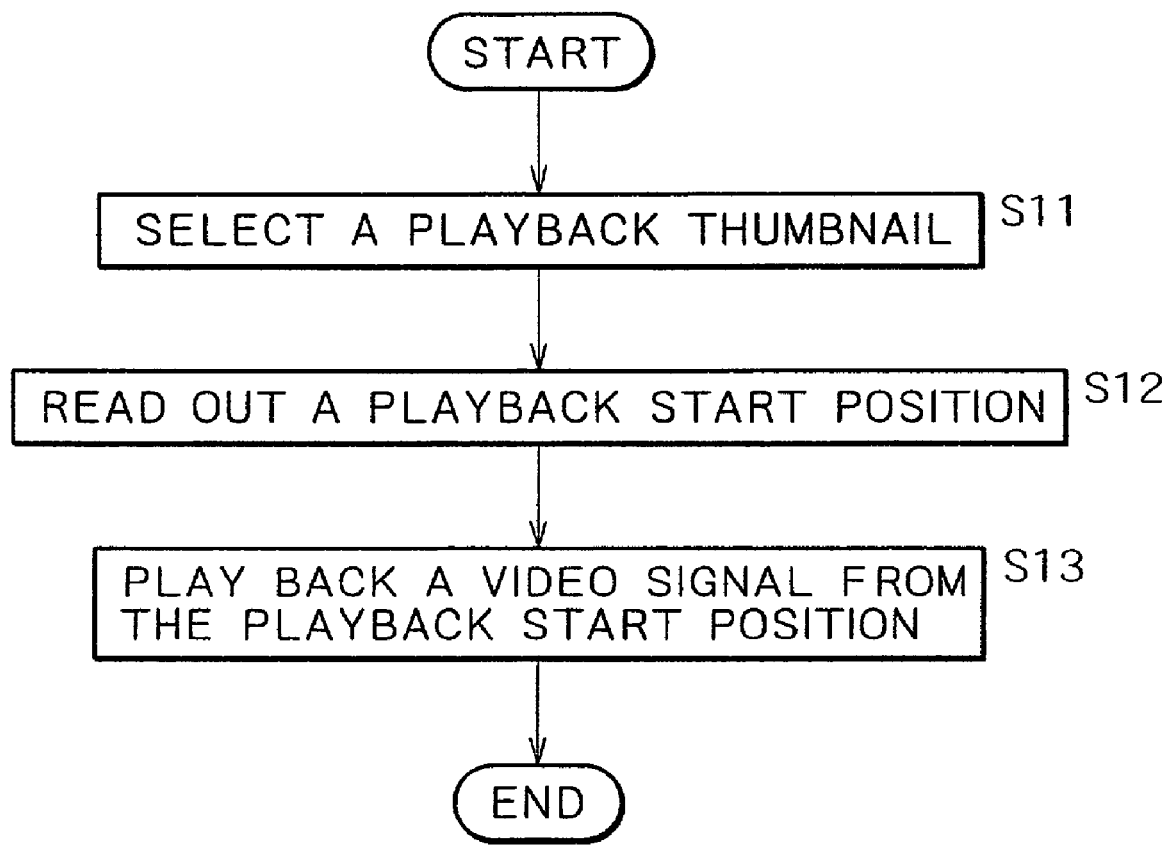
FIG. 4 shows a flowchart representing operations to play back a video signal from the hard disk recorder.

The following description explains a method, whereby the user utilizes a representative picture to start an operation to play back a title, by referring to a flowchart shown in FIG. 4.

Figure 5:
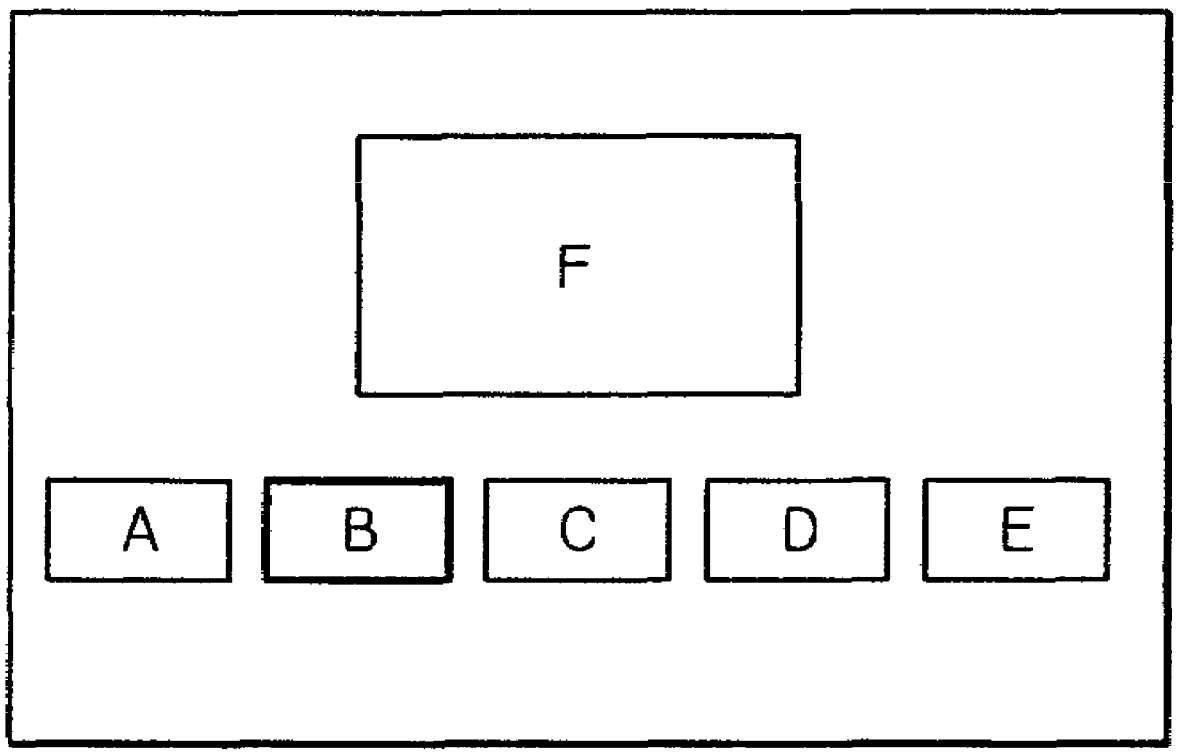
FIG. 5 is a diagram showing a typical GUI (Graphical User Interface) displayed on a monitor at the start of a playback operation.

A display unit as an external apparatus shows a set of representative pictures A to E each representing a title pertaining to a group of titles recorded on the hard disk of the hard disk drive 18 as shown in FIG. 5. The selected representative picture is highlighted and an enlarged picture is shown at an F position. The displayed representative pictures are each referred to hereafter as a thumbnail. The flowchart shown in FIG. 4 begins with a step S11 at which the user moves the cursor to one of the thumbnails that represents a desired program to select and play back the program.

At the next step S12, information on the position of the selected representative picture representing a start of a playback operation is read out from the hard disk of the hard disk drive 18.

At the next step S13, the location of a stream required in starting of an operation to play back the stream is detected from the retrieved information on the position of the frame. Data is then read out from the location in the hard disk of the hard disk drive 18 to start the playback operation.

It should be noted that, while a genre included in SI is used in this embodiment, EPG information superposed on a ground broadcast can also be used to carry out the same processing. In addition, if a genre can be acquired from information obtained from a network such as the Internet, the same processing can also be carried out. Information on a genre and/or information on a program, which are presented by using a recording medium such as an optical disk, can also be used. In addition, information on a genre set manually by the user can also be used.

Furthermore, besides information on a genre of a program, other information can also be used for automatically changing the algorithm of detecting a representative picture. For example, the position of a representative picture or information on each scene may be directly distributed as information on a program. In this case, it is possible to set an algorithm whereby the distributed information is used for determining a representative picture.

Moreover, if special-service information including urgent news or the like can be obtained as information on a program, an algorithm of detecting a representative picture in the scene can be changed to another algorithm whereby the representative picture with the greatest degree of importance is switched to the scene of an urgent news.

By the way, the series of pieces of processing described above can be carried out by hardware or through execution of software. When execution of software is selected for carrying out the series of pieces of processing, a variety of programs composing the software are executed by a computer incorporated in special hardware. As an alternative, the programs are installed from a recording medium into a recording memory employed, for example, in a general-purpose personal computer capable of executing the various programs to carry out the pieces of processing.

As shown in FIG. 1, recording media for presenting a program to the user is distributed separately from the computer. In order to present a program to the user, package media such as the magnetic disk 41 including a floppy disk, the optical disk 42 including a CD-ROM (Compact-Disk Read-Only Memory) and a DVD (Digital Versatile Disk), the magneto-optical disk 43 including an MD (Mini Disc) and the semiconductor memory 44 are generally used. However, the use of such package media is not mandatory. As an alternative, a program can also be presented to the user by incorporating the program in the computer in advance. That is to say, the program is stored in a ROM or a hard disk included in the HDD.

It should be noted that, in this specification, while steps prescribed in a program recorded in a recording medium can of course be executed sequentially along the time axis in an order the steps are prescribed in the program, the steps are not always executed sequentially along the time axis. That is to say, a program may include steps that are executed concurrently or independently.

In addition, the technical term 'system' used in this specification means the whole equipment comprising a plurality of apparatuses.

While a preferred embodiment of the present invention has been described using specific terms, such description is for illustrative purposes only, and it is to be understood that changes and variations may be made without departing from the spirit or scope of the following claims.

What is claimed is:

1. A video-signal recording and playback apparatus for recording and playing back a video signal of an audio-video program, said video-signal recording and playback apparatus comprising:

a detection means for detecting program-genre information related to a program being recorded;

a modification means for automatically modifying an algorithm for detecting a program-representative picture dependent on said detected program-genre information; and an evaluation means for attaching an evaluation value representing a degree of importance to the program representative picture.

2. A video-signal recording and playback method adopted in a video-signal recording and playback apparatus for recording and playing back a video signal of an audio-video program, said video-signal recording and playback method comprising steps of:

detecting program-genre information related to a program being recorded;

automatically modifying an algorithm for detecting a program-representative picture dependent on said detected program-genre information; and attaching an evaluation value, representing a degree of importance, to the program representative picture.

3. A recording medium for storing a computer-readable program, executable by a computer, for controlling a video-signal recording and playback apparatus for recording and playing back a video signal of an audio-video program, wherein said program causes said recording and playback apparatus to perform steps comprising:

detecting program-genre information related to a program being recorded;

automatically modifying an algorithm for detecting a program-representative picture dependent on said detected program-genre information; and attaching an evaluation value, representing a degree of importance, to the program representative picture.

4. A video-signal recording and playback apparatus configured to record and play back a video signal of an audio-video program, said video-signal recording and playback apparatus comprising:

a detector unit configured to detect program-genre information related to a program being recorded;

a modification unit configured to automatically modify an algorithm for detecting a program-representative picture dependent on said detected program-genre information; and an evaluation unit configured to attach an evaluation value, representing a degree of importance, to the program-representative picture.

5. A video-signal recording and playback apparatus for recording and playing back a video signal of an audio-video program, said video-signal recording and playback apparatus comprising:

a detection means for detecting program-genre information related to a program being recorded; and a modification means for automatically modifying an algorithm for detecting a program-representative picture dependent on said detected program-genre information, wherein the program-representative picture with a largest evaluation value among program-representative pictures detected for the program being recorded is displayed as representing the program being recorded, said evaluation value representing a degree of importance of the program representative picture.

6. A video-signal recording and playback method adopted in a video-signal recording and playback apparatus for recording and playing back a video signal of an audio-video program, said video-signal recording and playback method comprising steps of:

detecting program-genre information related to a program being recorded; and automatically modifying an algorithm for detecting a program-representative picture dependent on said detected program-genre information, wherein the program-representative picture with a largest evaluation value among program-representative pictures detected for the program being recorded is displayed as representing the program being recorded, said evaluation value representing a degree of importance of the program representative picture.

7. A recording medium for storing a computer-readable program, executable by a computer, for controlling a video-signal recording and playback apparatus for recording and playing back a video signal of an audio-video program, wherein said program causes said recording and playback apparatus to perform steps comprising:

detecting program-genre information related to a program being recorded; and automatically modifying an algorithm for detecting a program-representative picture dependent on said detected program-genre information, wherein the program-representative picture with a largest evaluation value among program-representative pictures detected for the program being recorded is displayed as representing the program being recorded, said evaluation value representing a degree of importance of the program representative picture.

8. A video-signal recording and playback apparatus configured to record and play back a video signal of an audio-video program, said video-signal recording and playback apparatus comprising:

a detector unit configured to detect program-genre information related to a program being recorded; and a modification unit configured to automatically modify an algorithm for detecting a program-representative picture dependent on said detected program-genre information, wherein the program-representative picture with a largest evaluation value among program-representative pictures detected for the program being recorded is displayed as representing the program being recorded, said evaluation value representing a degree of importance of the representative picture.

* * * * *